(12) United States Patent
Mizusaki et al.

(10) Patent No.: US 8,216,673 B2
(45) Date of Patent: Jul. 10, 2012

(54) GLASS FIBER-TREATING AGENT AND GLASS FIBER-TREATING COMPOSITION

(75) Inventors: Toru Mizusaki, Takefu (JP); Shuichiro Shinohara, Takefu (JP); Akira Yamamoto, Annaka (JP); Masaki Tanaka, Tokyo (JP)

(73) Assignees: Nissin Chemical Industry Co., Ltd., Takefu-Shi (JP); Shin-Etsu Chemical Co., Ltd., Tokyo (JP)

( * ) Notice: Subject to any disclaimer, the term of this patent is extended or adjusted under 35 U.S.C. 154(b) by 865 days.

(21) Appl. No.: 11/497,429

(22) Filed: Aug. 2, 2006

(65) Prior Publication Data

US 2007/0031671 A1 Feb. 8, 2007

(30) Foreign Application Priority Data

Aug. 3, 2005 (JP) ................. 2005-225377

(51) Int. Cl.
*B32B 9/00* (2006.01)
*C08F 283/00* (2006.01)

(52) U.S. Cl. ........ 428/391; 428/375; 428/392; 525/474; 525/487; 523/273

(58) Field of Classification Search .................. None
See application file for complete search history.

(56) References Cited

U.S. PATENT DOCUMENTS

| | | | | | |
|---|---|---|---|---|---|
| 2,893,913 | A | * | 7/1959 | Wicdow | 514/132 |
| 2,997,447 | A | * | 8/1961 | Leeds et al. | 516/72 |
| 3,108,902 | A | * | 10/1963 | Galli et al. | 442/147 |
| 3,235,602 | A | * | 2/1966 | Russell | 568/404 |
| 3,957,658 | A | * | 5/1976 | Chiesa et al. | 252/3 |
| 4,783,342 | A | * | 11/1988 | Polovina | 427/4 |
| 5,650,543 | A | * | 7/1997 | Medina | 568/616 |
| 5,882,669 | A | * | 3/1999 | Hondo et al. | 424/408 |
| 6,300,283 | B1 | * | 10/2001 | Sakuta | 504/362 |
| 6,528,070 | B1 | * | 3/2003 | Bratescu et al. | 424/401 |
| 6,656,598 | B2 | * | 12/2003 | Kudo et al. | 428/447 |
| 6,815,381 | B1 | * | 11/2004 | Yamamoto et al. | 442/187 |
| 2002/0072581 | A1 | | 6/2002 | Kudo et al. | 528/10 |
| 2003/0078307 | A1 | * | 4/2003 | Shinohara et al. | 516/113 |
| 2007/0191285 | A1 | * | 8/2007 | Akiyama et al. | 514/23 |
| 2008/0043080 | A1 | * | 2/2008 | Isobe | 347/101 |

FOREIGN PATENT DOCUMENTS

| | | | |
|---|---|---|---|
| EP | 655495 A1 | * | 5/1995 |
| EP | 1053678 A1 | * | 11/2000 |
| EP | 1673974 A1 | * | 6/2006 |
| JP | 5-156164 A | | 6/1993 |
| JP | 7-315888 A | | 12/1995 |
| JP | 10-72774 A | | 3/1998 |
| JP | 2000-290549 A | | 10/2000 |
| JP | 2000-327787 | | 11/2000 |
| JP | 2003-71219 | | 3/2003 |
| JP | 2005-103457 | | 4/2005 |
| JP | 2009084116 A | * | 4/2009 |
| WO | WO 2005/002340 A1 | * | 1/2005 |

OTHER PUBLICATIONS

"Dyanamic Surface Tension Effects on Spray Droplet Adhesion of Organosilicones" Policello, et al., pp. 1325-1330; 1993.*

* cited by examiner

*Primary Examiner* — Jill Gray

(74) *Attorney, Agent, or Firm* — Birch, Stewart, Kolasch & Birch, LLP

(57) ABSTRACT

Glass fiber-treating agent which includes: (A) 5-95% by weight of an acetylene glycol or an ethylene oxide and/or a propylene oxide adduct of an acetylene glycol; and (B) 5-95% by weight of a silicone surfactant which may be polyoxyalkylene-modified. The glass fiber-treating agent reduces dynamic and static surface tension and contact angle. The glass fiber-treating agent provides excellent wetting, penetration, and antifoaming properties when glass fibers are treated therewith.

5 Claims, No Drawings

GLASS FIBER-TREATING AGENT AND GLASS FIBER-TREATING COMPOSITION

CROSS-REFERENCE TO RELATED APPLICATION

This non-provisional application claims priority under 35 U.S.C. §119(a) on Patent Application No. 2005-225377 filed in Japan on Aug. 3, 2005, the entire contents of which are hereby incorporated by reference.

TECHNICAL FIELD

This invention relates to glass fiber-treating agents, and more particularly, to glass fiber-treating agents which are blended in silane coupling agent solutions or binder solutions used in the preparation of glass fibers to reduce the dynamic surface tension and contact angle so as to provide good wetting, penetrating and antifoaming properties, thereby accommodating high-speed coating and suppressing formation of defects by fluffing, leading to improved productivity and more efficient utilization, and which improve strength when glass fibers are sized with unsaturated polyester resin or epoxy resin sizing agents as molding resins. The invention also relates to glass fiber-treating compositions.

BACKGROUND ART

In the current glass fiber manufacturing art, binders and silane coupling agents are used for sizing and reinforcement of glass fibers. They are required to manage high-speed coating to glass fiber substrates associated with productivity improvements, anti-fluffing, a strength buildup that allows for formation of thin-film plates for multilayer capacitors as final products, and a strength buildup of FRP used in bath tabs or the like. It is also desired to improve strength when glass fibers are sized with unsaturated polyester resin or epoxy resin sizing agents as molding resins.

Under these circumstances, the glass fiber manufacturing art needs surfactants having surface tension and contact angle reducing capabilities for facilitating penetration of binders and silane coupling agents into glass fiber substrates.

Acetylene glycol type surfactants such as 2,4,7,9-tetramethyl-5-decyne-4,7-diol and ethylene oxide adducts thereof are currently used as wetting agents in glass fiber-treating compositions because of a good balance in their ability to lower both static and dynamic surface tensions, substantial elimination of the drawbacks of existing nonionic and anionic surfactants, and even anti-foaming ability. On use of binders, for example, vegetable oil, cationic surfactant, the above-mentioned surfactant for imparting penetrability to the substrates, and optionally wax are added to starch (serving as binder) to suppress fluffing. As performance and productivity improvements mark further advances, it is desired to further improve wetting, dispersing and similar properties.

As to the use of silane coupling agents, JP-A 7-315888 discloses a sizing agent comprising an epoxy resin, an epoxy resin curing agent, a silane coupling agent containing an epoxysilane, and a nonionic surfactant in the form of an ethylene oxide adduct of bisphenol A or polyethylene glycol fatty acid ester. However, these nonionic surfactants are sometimes inferior in penetration because of their high static surface tension as compared with silicone surfactants. As performance and productivity improvements mark further advances, it is desired to further improve wetting, dispersing and similar properties.

Also, silicone surfactants have been commercially used as penetrating agents in the glass fiber manufacturing art while taking advantage of their low surface tension and low contact. Although the silicone surfactants have good leveling, wetting and dispersing properties, their extraordinary foaming ability invites many practical troubles due to foams. Specifically, drawbacks like coating failure and irregularities on coating surface arise probably because of foams generated during coating and a high dynamic surface tension. This gives rise to a problem that no sufficient strength is exerted when unsaturated polyester resins or epoxy resins as molding resins are applied to glass fibers.

Prior Art 1: JP-A 7-315888
Prior Art 2: JP-A 2000-290549
Prior Art 3: JP-A 2000-327787

DISCLOSURE OF THE INVENTION

An object of the present invention is to provide a glass fiber-treating agent which functions to reduce both dynamic and static surface tension and contact angle, and exerts improved wetting and penetrating properties relative to substrates during coating as well as antifoaming property, and thus improves applicability. Another object of the invention is to provide a glass fiber-treating composition.

The inventors have found that when a glass fiber-treating agent comprising an acetylene glycol surfactant and a silicone surfactant, preferably nonionic silicone surfactant, more preferably polyoxyalkylene-modified silicone is used as an additive to binder solution or silane coupling agent solutions for glass fibers, this glass fiber-treating agent functions to reduce both surface tension and contact angle and exerts improved wetting, penetrating and antifoaming properties. The use of this glass fiber-treating agent overcomes the above-mentioned problems of the prior art.

The present invention provides a glass fiber-treating agent comprising (A) 5 to 95% by weight of at least one component selected from an acetylene glycol having the general formula (1) and an ethylene oxide and/or propylene oxide adduct of acetylene glycol having the general formula (2) and (B) 5 to 95% by weight of a silicone surfactant.

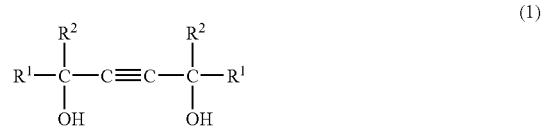

Herein $R^1$ and $R^2$ each are a $C_1$-$C_5$ alkyl group.

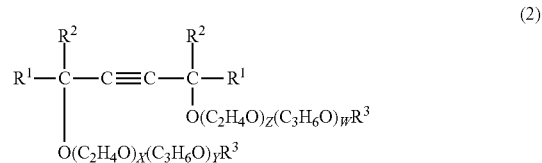

Herein $R^1$, $R^2$ and $R^3$ each are a $C_1$-$C_5$ alkyl group, X and Z each are a positive number of 0.5 to 25, Y and W each are a positive number of 0 to 25, and the sum of X+Y+Z+W is 1 to 50.

The present invention also provides a glass fiber-treating composition comprising a binder solution or silane coupling solution having the glass fiber-treating agent dissolved therein, the content of the glass fiber-treating agent being 0.01 to 5% by weight to the total weight of the binder solution or the silane coupling agent solution.

BENEFITS OF THE INVENTION

The glass fiber-treating agent of the invention provides a low contact angle immediately after dropwise deposition to a substrate and a low dynamic surface tension. When added to binder solution or silane coupling agent solutions used in the preparation of glass fibers to reduce the dynamic surface tension or contact angle, it offers good wetting (or traveling) and penetrating properties with respect to glass fibers and antifoaming properties, enabling efficient utilization thereof on the treatment glass fibers. This, combined with reduction of defectives by anti-fluffing at cut sections and improved travel, contributes to productivity improvements. The glass fiber-treating agent also improves strength when glass fibers are sized with unsaturated polyester resin or epoxy resin sizing agents as molding resins. While glass fibers are generally classified into yarns and rovings in terms of purpose, application, and handling during operation, the glass fiber-treating agent of the invention is highly effective to both yarns and rovings because of the above-mentioned features.

DESCRIPTION OF THE PREFERRED EMBODIMENTS

Component (A) in the glass fiber-treating agent of the present invention is one or more acetylene glycol selected from an acetylene glycol having the general formula (1) and an ethylene oxide and/or propylene oxide adduct of acetylene glycol having the general formula (2).

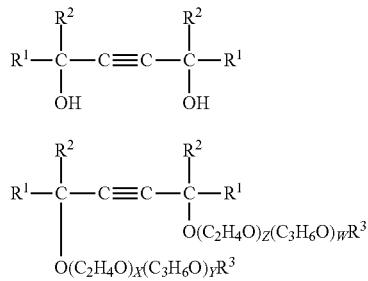

Herein $R^1$, $R^2$ and $R^3$ each are a $C_1$-$C_5$ alkyl group, X and Z each are a positive number of 0.5 to 25, Y and W each are a positive number of 0 to 25, and the sum of X+Y+Z+W is 1 to 50.

Examples of the acetylene glycol having formula (1) include 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 2,3,6,7-tetramethyl-4-octyne-3,6-diol, 3,6-dimethyl-4-octyne-3,6-diol, and 2,5-dimethyl-3-hexyne-2,5-diol.

Examples of the ethylene oxide and/or propylene oxide adduct of acetylene glycol having formula (2) include ethylene oxide and/or propylene oxide derivatives of the foregoing acetylene glycols such as an ethylene oxide adduct of 2,5,8,11-tetramethyl-6-dodecyne-5,8-diol (moles of ethylene oxide added=6), an ethylene oxide adduct of 2,4,7,9-tetramethyl-5-decyne-4,7-diol (moles of ethylene oxide added=10), an ethylene oxide adduct of 2,4,7,9-tetramethyl-5-decyne-4,7-diol (moles of ethylene oxide added=4), an ethylene oxide/propylene oxide adduct of 2,4,7,9-tetramethyl-5-decyne-4,7-diol (moles of ethylene oxide added=5, moles of propylene oxide added=2), an ethylene oxide adduct of 3,6-dimethyl-4-octyne-3,6-diol (moles of ethylene oxide added=4), and the like. The moles of ethylene oxide units added in the acetylene glycol is in a range of 0.5 to 25 moles, the moles of propylene oxide units added is in a range of 0 to 25 moles, preferably 0.5 to 25 moles, and the total moles of these addition units is 1 to 50 moles. If the total moles of ethylene oxide and/or propylene oxide added is more than 50 moles, a solubility in water increases, and hence, a foaming ability increases, detracting from the antifoaming effect.

These acetylene glycols as component (A) may be used alone or in admixture of two or more. In preparing the glass fiber-treating agent of the invention, the acetylene glycol is used in an amount of 5 to 95% by weight, preferably 20 to 80% by weight based on the overall glass fiber-treating agent. Less than 5% by weight of the acetylene glycol leads to a loss of the antifoaming effect, allowing pinholes to result from foams and losing the viscosity-reducing effect. More than 95% by weight of the acetylene glycol leads to a reduced solubility in water or an organic solvent, allows agglomerates to form when blended in other compositions, and loses the desired surface tension-reducing effect, causing coating failure and irregularities on coating surface.

Component (B) is a silicone surfactant which includes anionic, nonionic, cationic, and ampholytic silicone surfactants. Suitable anionic silicone surfactants include carboxylic acid salt-modified silicones, sulfonic acid salt-modified silicones, sulfuric ester salt-modified silicones, and phosphoric ester salt-modified silicones. Suitable nonionic silicone surfactants include polyoxyalkylene-modified silicones, (poly)glycerin-modified silicones, and sucrose-modified silicones. Suitable cationic silicone surfactants include quaternary ammonium-modified silicones. Suitable ampholytic silicone surfactants include betaine-modified silicones. Of these, nonionic silicone surfactants are preferred for adaptability to a wide range of application, with polyoxyalkylene-modified silicones being more preferred for ease of availability of raw material and economy.

The polyoxyalkylene-modified silicones are not particularly limited as long as they are silicone compounds having polyoxyalkylene chains in their structure. Preferred are polyoxyalkylene-modified silicones having the average compositional formula (3).

  (3)

Herein $R^4$ is an aliphatic saturation-free, substituted or unsubstituted, monovalent hydrocarbon group of 1 to 10 carbon atoms, $R^5$ is an organic group of the formula: —$C_fH_{2f}O$($C_gH_{2g}O$)$_hR^6$ wherein $R^6$ is hydrogen, an aliphatic saturation-free, substituted or unsubstituted, monovalent hydrocarbon group or acetylene group, f is an integer of 2 to 12, g is an integer of 2 to 4, and h is an integer of 1 to 200. The subscripts p and q are positive numbers satisfying $0 \leq p < 3.0$, $0 < q < 3.0$, and $0 < p+q \leq 3.0$.

Examples of the hydrocarbon groups represented by $R^4$ include alkyl groups such as methyl, ethyl, propyl, butyl, pentyl, hexyl, heptyl, octyl, nonyl, and decyl; cycloalkyl groups such as cyclopentyl and cyclohexyl; aryl groups such as phenyl and tolyl; aralkyl groups such as benzyl and phenethyl; and fluoroalkyl groups such as trifluoropropyl and heptadecafluorodecyl. Methyl is preferred from the standpoint of surface tension reducing ability. $R^6$ is preferably selected from hydrogen, monovalent hydrocarbon groups of 1 to 4 carbon atoms, and acetyl, with illustrative examples including hydrogen, methyl, ethyl, propyl, butyl and acetyl.

The subscript f is an integer of 2 to 12, preferably 2 to 6, more preferably equal to 3; g is an integer of 2 to 4, preferably 2 or 3, more preferably equal to 2, with a combination of 2 and 3 being acceptable. The subscript h is an integer of 1 to 200, preferably 1 to 100, more preferably 1 to 50.

The subscripts p and q are positive numbers satisfying $0 \leq p \leq 3.0$, $0 < q < 3.0$, and $0 < p+q \leq 3.0$, preferably $1.0 \leq p < 3.0$, $0 \leq q \leq 2.0$, and $1.0 < p+q \leq 3.0$.

Specific examples of the polyoxyalkylene-modified silicones having the formula (3) are polyoxyalkylene-modified silicones having the following formula:

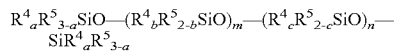

wherein $R^4$ and $R^5$ are as defined above, m and n are integers, the sum of m+n is from 0 to 198, preferably 1 to 100, a is an integer of 1, 2 or 3, each of b and c is 1 or 2, with the proviso that at least one $R^5$ is included in the formula.

The polyoxyalkylene-modified silicone should preferably contain 30 to 80% by weight, more preferably 40 to 60% by weight of polyoxyethylene. A polyoxyethylene content of less than 30% by weight may lead to a less solubility in water or an organic solvent, resulting in a cloudy or separated composition. A polyoxyethylene content of more than 80% by weight may adversely affect the surface tension reducing ability.

Preferably the polyoxyalkylene-modified silicone has 2 to 200 silicon atoms, more preferably 2 to 10 silicon atoms because such relatively low molecular weight ones are good in water solubility and surface tension reducing ability.

Illustrative, non-limiting examples of the polyoxyalkylene-modified silicone include those of the formulae (4) through (13) shown below.

(4)

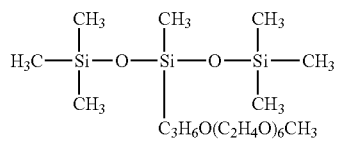

polyoxyethylene content : 47.3 wt %

(5)

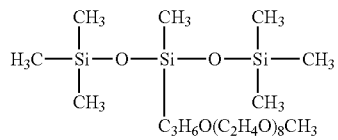

polyoxyethylene content : 54.5 wt %

(6)

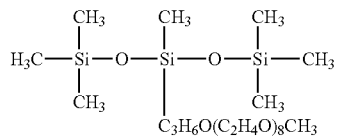

polyoxyethylene content : 55.7 wt %

(7)

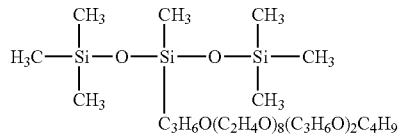

polyoxyethylene content : 43.4 wt %

-continued (8)

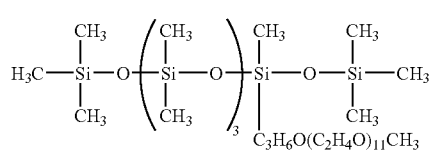

polyoxyethylene content : 48.4 wt %

(9)

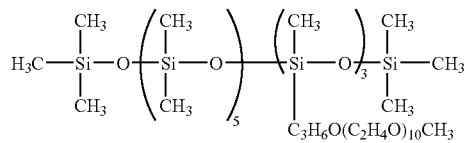

polyoxyethylene content : 58.7 wt %

(10)

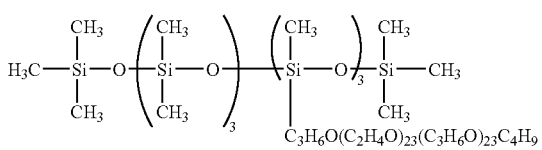

polyoxyethylene content : 38.2 wt %

(11)

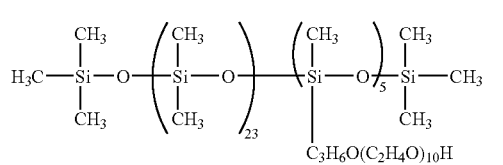

polyoxyethylene content : 47.3 wt %

(12)

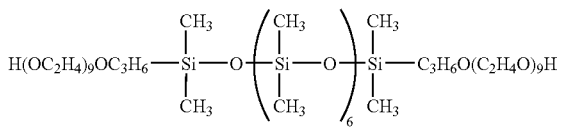

polyoxyethylene content : 53.3 wt %

(13)

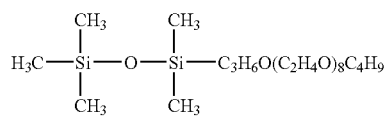

polyoxyethylene content : 57.4 wt %

These silicone surfactants as component (B) may be used alone or in admixture of two or more. In preparing the glass fiber-treating agent of the invention, the silicone surfactant is used in an amount of 5 to 95% by weight, preferably 20 to 80% by weight based on the overall glass fiber-treating agent.

It is preferred in the practice of the invention to combine components (A) and (B) to give a total amount of 100% by weight. The agent may further contain a third component or component (C), which is deionized water, or a water-soluble organic solvent such as ethylene glycol, diethylene glycol, triethylene glycol, tetraethylene glycol, polyethylene glycol, propylene glycol, dipropylene glycol, 1,3-propane diol, 1,4-butane diol, or glycerin. The third component may be used in an amount of 0 to 25% by weight, preferably 5 to 20% by weight based on the overall composition as long as this does not adversely affect the physical properties of the inventive composition.

The glass fiber-treating agent of the invention may be prepared by combining the foregoing components by a well-known mixing technique on a propeller agitator or the like. Any component which is solid at normal temperature is heated, if necessary, before mixing.

The glass fiber-treating agent thus obtained is desirably such that a 0.1 wt % aqueous solution thereof has a contact angle equal to or less than 50°, preferably 1° to 30°, more preferably 1° to 20°, a dynamic surface tension equal to or less than 50 mN/m, preferably 10 to 50 mN/m, more preferably 20 to 40 mN/m, and a static surface tension equal to or less than 35 mN/m, preferably 10 to 25 mN/m. It is noted that the contact angle is measured on a droplet of the 0.1 wt % aqueous solution at 30 seconds after deposition using a contact angle meter CA-D (Kyowa Interface Science Co., Ltd.); the dynamic surface tension is measured on the 0.1 wt % aqueous solution at 1 Hz and 10 Hz using a bubble pressure dynamic tensiometer Kruss BP-2 (Krüss GmbH); the static surface tension is measured on the 0.1 wt % aqueous solution using a surface tensiometer ESB-V (Kyowa Interface Science Co., Ltd.). If the contact angle of a droplet of the 0.1 wt % glass fiber-treating agent aqueous solution after 30 seconds from deposition is too large, a binder solution or silane coupling agent solution with the agent added thereto may invite a coating failure due to insufficient wetting. Likewise, if the dynamic surface tension at 1 Hz and 10 Hz of the 0.1 wt % glass fiber-treating agent aqueous solution is too high, a binder solution or silane coupling agent solution with the agent added thereto may invite a coating failure due to insufficient wetting.

Because of its ability to reduce dynamic surface tension and contact angle, the glass fiber-treating agent of the invention, when blended in a silane coupling agent solution or binder solution used in the preparation of glass fibers, exerts excellent wetting, penetrating and antifoaming properties. Then the solution can accommodate high-speed coating during the glass fiber preparation and suppress development of defects by fluffing, leading to improved productivity. Due to excellent wetting, penetrating and antifoaming properties, the treating agent is efficiently utilized. The treating agent is effective for improving strength when glass fibers are sized with unsaturated polyester resin or epoxy resin sizing agents as molding resins.

When a glass fiber-treating composition of the invention is prepared by using the glass fiber-treating agent as a penetrating agent in a binder or silane coupling agent, the glass fiber-treating agent is preferably added in an amount of 0.01 to 5% by weight, more preferably 0.05 to 2% by weight based on the total weight of the binder solution or the silane coupling agent solution.

With respect to the binder solution, a binder-based glass fiber treating composition comprises 2 to 20 parts by weight of a binder, 0 to 5 parts by weight of an oily substance, 0 to 5 parts by weight of a surfactant (especially a cationic surfactant) other than the above-described surfactants, 80 to 98 parts by weight of water and/or an organic solvent, and 0.01 to 5 parts by weight of the glass fiber-treating agent. The total weight is 100 parts by weight.

With respect to the silane coupling agent solution, a silane coupling agent based glass fiber-treating composition comprises 0 to 5 parts by weight of an organic acid such as acetic acid, a silane coupling agent, 85 to 99 parts by weight of water and/or an organic solvent, and 0.01 to 5 parts by weight of the glass fiber-treating agent. The total weight is 100 parts by weight.

Examples of suitable binders used herein include, but are not limited to, polyvinyl alcohol resins, polyvinyl acetate resins, polyacrylate resins, water-soluble polymers, phenolic resins, melamine resins, urea resins, polyester resins, epoxy resins, polystyrene, and polyurethane.

Examples of suitable coupling agents include, but are not limited to, vinyltris(β-methoxyethoxy)silane, γ-methacryloxypropyltrimethoxysilane, γ-glycidoxypropyltrimethoxysilane, γ-aminopropyltriethoxysilane, methacrylate chromic chloride, γ-chloropropyltrimethoxysilane, vinyltrichlorosilane, vinyltrimethoxysilane, vinylbenzylsilane, N-β-(N-vinylbenzylaminoethyl)-γ-aminopropyltrimethoxysilane hydrogen chloride, and mixtures thereof while other nonionic or cationic surfactants may be used in combination. The aqueous medium is typically water while organic solvents such as alcohols including lower alcohols and polyhydric alcohols, ethers or the like may also be used.

When the organic solvent is mixed with water, the organic solvent may desirably contain 0 to 5% by weight, preferably 0.5 to 5% by weight, especially 1 to 2% by weight.

Examples of the oily substances include higher fatty acids and their derivatives (salts, esters, etc.), higher alcohols, and silicone oils. More specifically, exemplary oily substances include animal oils such as beef tallow and their hydrogenated oils, vegetable oils such as sesame oil, rapeseed oil, palm oil, soybean oil and their hydrogenated oils, condensates of higher fatty acids and higher alcohols, and modified silicone oils, although the oily substances are not limited thereto. Examples of the other surfactants include alkyltrimethylammonium chloride, dialkyldimethylammonium chloride and alkylamine salts as a cationic surfactant, and polyethyleneoxide alkyl ether and polyethylene glycol as a nonionic surfactant.

The glass fiber-treating agent of the invention is applicable to glass fibers of any type. Examples include alkali glass, alkali-free glass, low dielectric glass, high-modulus glass and E glass.

The glass fibers are typically divided into two types, yarn and roving. The former is made by bundling glass (filaments) together to weave into cloth, removing a binder used in the bundling step, and thereafter applying a coupling agent. The latter is made by bundling glass (filaments) together and winding them up onto a cake in a semidried state, drying them, and holding a certain number of fibers. The inventive composition is effectively used for both types. More specifically, the composition can be used for an addition to the binder used in the bundling step as well as an addition to the coupling agent applied in the production of yarn. When making yarn, inadequate coupling treatment of the surface of glass gives rise to such problems that it fails to impart satisfactory strength in a subsequent resin finishing. The use of the inventive composition can solve such problems.

EXAMPLE

Examples and Comparative Examples are given below for further illustrating the invention although the invention is not limited thereby. In Examples, all parts and percents are by weight.

Example 1

Into a vessel equipped with a propeller agitator was fed 55 parts of 2,4,7,9-tetramethyl-5-decyne-4,7-diol (trade name Surfynol 104 by Air Products and Chemicals Inc.) heated at 70° C. With agitation, 45 parts of a polyoxyalkylene-modified silicone (polyoxyethylene content: 47.3%) of the formula (4):

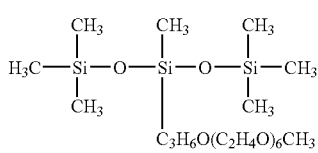

(4)

was slowly added and mixed. After 2 hours of continuous agitation, the mixture was cooled to room temperature.

After cooling, the mixture was filtered through a 200-mesh fabric filter, yielding a glass fiber-treating agent, designated M-1.

Then, 0.1 part of the glass fiber-treating agent M-1 was added to 100 parts of deionized water, which was stirred by means of a magnetic stirrer into a 0.1% aqueous solution. The aqueous solution was examined for outer appearance, contact angle, dynamic and static surface tensions under the test conditions shown below. The results are shown in Table 2.

Also, using the glass fiber-treating agent M-1, a binder aqueous solution and a silane coupling agent aqueous solution were prepared according to the formulations shown below. The binder aqueous solution was examined for dynamic and static surface tensions, and fluffing, with the results shown in Table 3. The silane coupling agent aqueous solution was examined for contact angle, dynamic and static surface tensions, tensile strength, and elongation, with the results shown in Table 4.

Formulation of Binder Aqueous Solution

A binder aqueous solution with the glass fiber-treating agent added, designated B-1, was prepared by adding 2 parts of hydrogenated vegetable oil, 0.4 part of a cationic surfactant (trade name Catiogen ESO by Dai-Ichi Kogyo Seiyaku Co., Ltd.) and 0.1 part of the glass fiber-treating agent M-1 to 100 parts of a 5% aqueous solution of high-amylose type etherified corn starch (trade name Piostarch KY by Nippon Starch Chemical Co., Ltd.).

Formulation of Silane Coupling Agent Aqueous Solution

A silane coupling agent aqueous solution with the glass fiber-treating agent added, designated S-1, was prepared by slowly adding 1 part of a silane coupling agent (chemical name 3-methacryloxypropyltriethoxysilane, trade name KBM-503, Shin-Etsu Chemical Co., Ltd.) and 0.05 part of the glass fiber-treating agent M-1 to 100 parts of 1% acetic acid water with stirring, and stirring for 30 minutes.

Physical properties were measured as follows.

Evaluation of 0.1% Aqueous Solution of Glass Fiber-Treating Agent M-1

(1) Appearance of Aqueous Solution

The 0.1% aqueous solution of glass fiber-treating agent M-1 was visually observed for appearance and the presence of insoluble matter.

◯: Solution was clear, no insolubles observed
Δ: Solution was cloudy, no insolubles observed
X: some insolubles observed
XX: substantially undissolved (2) Contact Angle Using a contact angle meter CA-D (Kyowa Interface Science Co., Ltd.), the contact angle of a droplet of the 0.1% aqueous solution was measured at 30 seconds after deposition.

(3) Dynamic Surface Tension

The dynamic surface tension at 1 Hz and 10 Hz of the 0.1% aqueous solution was measured with a bubble pressure dynamic tensiometer Kruss BP-2 (Kruss GmbH).

(4) Static Surface Tension

The static surface tension of the 0.1% aqueous solution was measured with a surface tensiometer ESB-V (Kyowa Interface Science Co., Ltd.).

Evaluation of Binder Aqueous Solution Having Glass Fiber-Treating Agent M-1 Added Thereto (1) Dynamic Surface Tension The dynamic surface tension at 1 Hz and 10 Hz of the binder aqueous solution was measured with a bubble pressure dynamic tensiometer Kruss BP-2 (Krüss GmbH).

(2) Static Surface Tension

The static surface tension of the binder aqueous solution was measured with a surface tensiometer ESB-V (Kyowa Interface Science Co., Ltd.).

(3) Fluffing

Using a high-speed air-jet loom, yarns having 1% of the binder aqueous solution deposited thereon were woven into a glass cloth. On the surface of the glass cloth as woven, the number of fluffs was counted and rated on a scale from 1 to 5. Point 1 corresponds to least fluffs and point 5 most fluffs. A cloth rated as point 3 or less is acceptable on practical use.

Evaluation of Silane Coupling Agent Aqueous Solution Having Glass Fiber-Treating Agent M-1 Added Thereto (1) Contact Angle Using a contact angle meter CA-D (Kyowa Interface Science Co., Ltd.), the contact angle of a droplet of the silane coupling agent aqueous solution was measured at 30 seconds after deposition.

(2) Dynamic Surface Tension

The dynamic surface tension at 1 Hz and 10 Hz of the silane coupling agent aqueous solution was measured with a bubble pressure dynamic tensiometer Kruss BP-2 (Kruss GmbH).

(3) Static Surface Tension

The static surface tension of the silane coupling agent aqueous solution was measured with a surface tensiometer ESB-V (Kyowa Interface Science Co., Ltd.).

(4) Tensile Strength

Using the silane coupling agent aqueous solution with glass fiber-treating agent M-1 added thereto and glass fibers ECG 751/2 (135 tex) having unsaturated polyester resin deposited in a buildup of 0.3%, a glass fiber fabric was woven at a yarn density of 29 warps/25 mm and 30 wefts/25 mm.

Test pieces of 40 mm wide by 420 mm long were cut out of the fabric in warp and weft directions. While each test piece was clamped at a span of 320 mm and pulled at a clamp moving speed of 200 mm/min, a load (N) at break was measured.

(5) Elongation

In the above tensile strength test, an elongation at break was recorded.

Examples 2-6 and Comparative Examples 1-6

As in Example 1, glass fiber-treating agents M-2 to M-12 were prepared by stirring and mixing components the type and amount (%) of which are shown in Table 1. Any component which was solid at room temperature was heated at 70° C. before mixing.

As in Example 1, 0.1% aqueous solutions of the glass fiber-treating agents were prepared and tested, with the results shown in Table 2. As in Example 1, binder aqueous solutions (designated B-2 to B-14) and silane coupling agent aqueous solutions (designated S-2 to S-14) both having glass fiber-treating agents added thereto were prepared. The binder aqueous solutions were measured for dynamic and static surface tension, and fluffing, with the results shown in Table 3. The silane coupling agent aqueous solutions were measured for contact angle, dynamic and static surface tension, tensile strength and elongation, with the results shown in Table 4.

Comparative Examples 7, 8

Using a commercial product 1 (CP-1): Dapro W-77 (trade name of succinate surfactant, by Elementis) and a commercial product 2 (CP-2): Nonipol 160 (trade name of polyoxyethylene nonyl phenyl ether, by Sanyo Chemical Industries Ltd.), the same tests as in Example 1 were carried out. The results are also shown in Tables 2, 3 and 4.

TABLE 1

|  | Example | | | | | | Comparative Example | | | | | |
|---|---|---|---|---|---|---|---|---|---|---|---|---|
|  | 1 | 2 | 3 | 4 | 5 | 6 | 1 | 2 | 3 | 4 | 5 | 6 |
| Glass fiber-treating agent | M-1 | M-2 | M-3 | M-4 | M-5 | M-6 | M-7 | M-8 | M-9 | M-10 | M-11 | M-12 |
| Formulation (wt%) | | | | | | | | | | | | |
| Component A | | | | | | | | | | | | |
| A-1 | 55 |  | 55 |  |  |  | 75 |  |  |  |  |  |
| A-2 |  | 60 |  |  |  |  |  |  |  |  |  |  |
| A-3 |  |  |  |  |  | 25 |  | 80 |  |  |  |  |
| A-4 |  |  |  | 75 |  |  |  |  |  |  |  |  |
| A-5 |  |  |  |  | 70 |  |  |  |  |  |  |  |
| A-6 |  |  |  |  |  |  |  |  |  | 40 | 50 | 100 |
| Component B | | | | | | | | | | | | |
| B-1 | 45 |  | 35 |  |  |  |  |  |  |  |  |  |
| B-2 |  |  |  | 5 |  | 75 |  |  |  |  |  |  |
| B-3 |  | 20 |  | 20 | 30 |  |  |  |  |  |  |  |
| B-4 |  |  |  |  |  |  |  |  | 25 |  |  |  |
| B-5 |  |  |  |  |  |  |  |  | 25 |  |  |  |
| B-6 |  |  |  |  |  |  |  |  |  | 40 |  | 100 |
| Component C | | | | | | | | | | | | |
| ethylene glycol |  |  | 10 |  |  |  | 25 | 10 |  |  |  |  |
| propylene glycol |  | 15 |  |  |  |  |  |  |  |  | 5 |  |
| polyethylene glycol |  |  |  |  |  |  |  |  | 15 |  |  |  |
| glycerin |  | 5 |  |  |  |  |  |  |  |  |  |  |
| deionized water |  |  | 5 |  |  |  |  | 5 | 5 |  |  |  |

Component A
A-1: 2,4,7,9-tetramethyl-5-decyne-4,7-diol (Surfynol 104)
A-2: 3,6-dimethyl-4-octyne-3,6-diol (Surfynol 82)
A-3: 2,5,8,11-tetramethyl-6-dodecyne-5,8-diol (Surfynol DF-110)
A-4: ethylene oxide adduct of 2,4,7,9-tetramethyl-5-decyne-4,7-diol (Surfynol 465, moles of ethylene added = 10)
A-5: ethylene oxide and propylene oxide adduct of 2,4,7,9-tetramethyl-5-decyne-4,7-diol (Surfynol 2502, moles of ethylene added = 5, moles of propylene added = 2)
A-6: ethylene oxide and propylene oxide adduct of 2,4,7,9-tetramethyl-5-decyne-4,7-diol (moles of ethylene added = 60, moles of propylene added = 5)
Note that Surfynol is the trade mark of products by Air Products and Chemicals Inc.

Component B
B-1: polyoxyalkylene-modified silicone of formula (4) (polyoxyethylene content: 47.3%)

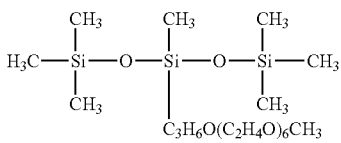

(4)

B-2: polyoxyalkylene-modified silicone of formula (5) (polyoxyethylene content: 54.5%)

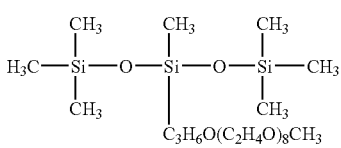

(5)

B-3: polyoxyalkylene-modified silicone of formula (6) (polyoxyethylene content: 55.7%)

TABLE 1-continued

|  | Example | | | | | | Comparative Example | | | | | |
|---|---|---|---|---|---|---|---|---|---|---|---|---|
|  | 1 | 2 | 3 | 4 | 5 | 6 | 1 | 2 | 3 | 4 | 5 | 6 |

(6)

$$H_3C-\underset{\underset{CH_3}{|}}{\overset{\overset{CH_3}{|}}{Si}}-O-\underset{\underset{C_3H_6O(C_2H_4O)_8H}{|}}{\overset{\overset{CH_3}{|}}{Si}}-O-\underset{\underset{CH_3}{|}}{\overset{\overset{CH_3}{|}}{Si}}-CH_3$$

B-4: polyoxyalkylene-modified silicone of formula (7)
(polyoxyethylene content: 43.4%)

(7)

$$H_3C-\underset{\underset{CH_3}{|}}{\overset{\overset{CH_3}{|}}{Si}}-O-\underset{\underset{C_3H_6O(C_2H_4O)_8(C_3H_6O)_2C_4H_9}{|}}{\overset{\overset{CH_3}{|}}{Si}}-O-\underset{\underset{CH_3}{|}}{\overset{\overset{CH_3}{|}}{Si}}-CH_3$$

B-5: polyoxyalkylene-modified silicone of formula (8)
(polyoxyethylene content: 48.4%)

(8)

$$H_3C-\underset{\underset{CH_3}{|}}{\overset{\overset{CH_3}{|}}{Si}}-O{\left(\underset{\underset{CH_3}{|}}{\overset{\overset{CH_3}{|}}{Si}}-O\right)}_3-\underset{\underset{C_3H_6O(C_2H_4O)_{11}CH_3}{|}}{\overset{\overset{CH_3}{|}}{Si}}-O-\underset{\underset{CH_3}{|}}{\overset{\overset{CH_3}{|}}{Si}}-CH_3$$

B-6: polyoxyalkylene-modified silicone of formula (9)
(polyoxyethylene content: 58.7%)

(9)

$$H_3C-\underset{\underset{CH_3}{|}}{\overset{\overset{CH_3}{|}}{Si}}-O{\left(\underset{\underset{CH_3}{|}}{\overset{\overset{CH_3}{|}}{Si}}-O\right)}_5{\left(\underset{\underset{C_3H_6O(C_2H_4O)_{10}CH_3}{|}}{\overset{\overset{CH_3}{|}}{Si}}-O\right)}_3-\underset{\underset{CH_3}{|}}{\overset{\overset{CH_3}{|}}{Si}}-CH_3$$

TABLE 2

Aqueous solution of glass fiber-treating agent

|  | Example | | | | | | Comparative Example | | | | | | | |
|---|---|---|---|---|---|---|---|---|---|---|---|---|---|---|
|  | 1 | 2 | 3 | 4 | 5 | 6 | 1 | 2 | 3 | 4 | 5 | 6 | 7 | 8 |
| Glass fiber-treating agent | M-1 | M-2 | M-3 | M-4 | M-5 | M-6 | M-7 | M-8 | M-9 | M-10 | M-11 | M-12 | CP-1 | CP-2 |
| Appearance | ○ | ○ | ○ | ○ | ○ | ○ | Δ | X | ○ | ○ | ○ | ○ | ○ | ○ |
| Contact angle (°) | <5 | <5 | <5 | <5 | <5 | <5 | 71.4 | 68.1 | 33.2 | 42.0 | 80.6 | 30.1 | 32.1 | 70.2 |
| Dynamic surface tension (mN/m) 1 Hz | 25.5 | 26.0 | 25.8 | 29.0 | 27.5 | 25.4 | 37.9 | 27.0 | 43.5 | 49.2 | 54.5 | 43.5 | 35.5 | 41.6 |
| Dynamic surface tension (mN/m) 10 Hz | 36.5 | 39.0 | 37.2 | 41.0 | 39.2 | 38.2 | 40.7 | 35.1 | 53.4 | 55.5 | 56.3 | 56.0 | 52.7 | 48.9 |
| Static surface tension (mN/m) | 20.8 | 20.9 | 20.8 | 22.7 | 20.5 | 21.3 | 31.0 | 25.6 | 24.0 | 46.1 | 52.0 | 22.1 | 36.0 | 38.1 |

TABLE 3

Binder aqueous solution with glass fiber-treating agent added

|  | Example | | | | | | Comparative Example | | | | | | | |
|---|---|---|---|---|---|---|---|---|---|---|---|---|---|---|
|  | 1 | 2 | 3 | 4 | 5 | 6 | 1 | 2 | 3 | 4 | 5 | 6 | 7 | 8 |
| Formulation No. | B-1 | B-2 | B-3 | B-4 | B-5 | B-6 | B-7 | B-8 | B-9 | B-10 | B-11 | B-12 | B-13 | B-14 |
| Glass fiber-treating agent | M-1 | M-2 | M-3 | M-4 | M-5 | M-6 | M-7 | M-8 | M-9 | M-10 | M-11 | M-12 | CP-1 | CP-2 |
| Dynamic surface tension (mN/m) 1 Hz | 43.9 | 44.2 | 43.5 | 46.5 | 44.5 | 43.2 | 52.9 | 44.3 | 58.5 | 60.5 | 62.5 | 55.5 | 53.5 | 57.9 |
| Dynamic surface tension (mN/m) 10 Hz | 50.7 | 51.2 | 50.2 | 54.5 | 52.7 | 51.5 | 57.8 | 50.1 | 64.5 | 66.5 | 68.9 | 67.2 | 58.6 | 65.2 |

TABLE 3-continued

Binder aqueous solution with glass fiber-treating agent added

| | Example | | | | | | Comparative Example | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Static surface tension (mN/m) | 39.7 | 39.9 | 38.7 | 41.5 | 40.2 | 38.5 | 46.2 | 42.6 | 40.0 | 42.5 | 59.5 | 39.5 | 50.1 | 55.2 |
| Fluffing | 1 | 2 | 2 | 3 | 2 | 2 | 4 | 5 | 4 | 5 | 5 | 4 | 5 | 5 |

TABLE 4

Silane coupling agent aqueous solution with glass fiber-treating agent added

| | Example | | | | | | Comparative Example | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Formulation No. | S-1 | S-2 | S-3 | S-4 | S-5 | S-6 | S-7 | S-8 | S-9 | S-10 | S-11 | S-12 | S-13 | S-14 |
| Glass fiber-treating agent | M-1 | M-2 | M-3 | M-4 | M-5 | M-6 | M-7 | M-8 | M-9 | M-10 | M-11 | M-12 | CP-1 | CP-2 |
| Contact angle (°) | 10.2 | 11.3 | 12.5 | 14.6 | 13.2 | 15.7 | 78.8 | 79.9 | 48.5 | 57.0 | 89.6 | 68.1 | 48.0 | 90.2 |
| Dynamic surface tension (mN/m) 1 Hz | 45.5 | 43.0 | 45.8 | 46.0 | 44.5 | 44.4 | 55.9 | 57.0 | 58.2 | 66.2 | 55.5 | 53.5 | 48.5 | 49.0 |
| Dynamic surface tension (mN/m) 10 Hz | 50.5 | 49.0 | 53.2 | 53.0 | 52.1 | 49.2 | 62.7 | 68.1 | 63.6 | 69.3 | 59.3 | 57.0 | 57.7 | 51.9 |
| Static surface tension (mN/m) | 20.5 | 19.5 | 23.8 | 23.9 | 22.5 | 21.6 | 54.9 | 56.4 | 25.6 | 27.2 | 56.9 | 28.5 | 47.8 | 47.5 |
| Tensile strength in warp (kN/m) | 202 | 197 | 198 | 204 | 203 | 203 | 177 | 178 | 180 | 170 | 157 | 174 | 173 | 165 |
| Tensile strength in weft (kN/m) | 192 | 187 | 190 | 191 | 190 | 190 | 167 | 166 | 169 | 159 | 149 | 165 | 161 | 154 |
| Elongation in warp (%) | 6 | 7 | 7 | 6 | 6 | 7 | 5 | 5 | 4 | 5 | 4 | 4 | 5 | 4 |
| Elongation in weft (%) | 7 | 8 | 8 | 8 | 7 | 8 | 6 | 6 | 5 | 5 | 6 | 5 | 6 | 5 |

Japanese Patent Application No. 2005-225377 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A glass fiber-treating composition comprising a silane coupling agent solution, said silane coupling agent solution comprising a silane coupling agent selected from the group consisting of vinyltris(β-methoxyethoxy)silane, γ-methacryloxypropyltrimethoxysilane, γ-glycidoxypropyltrimethoxysilane, γ-aminopropyltriethoxysilane, methacrylate chromic chloride, γ-chloropropyltrimethoxysilane, vinyltrichlorosilane, vinyltrimethoxysilane, vinylbenzylsilane, N-γ-(N-vinylbenzylaminoethyl)-γ-aminopropyltrimethoxysilane hydrogen chloride, and mixtures thereof, having a glass fiber-treating agent dissolved therein, wherein said glass fiber-treating agent comprises (A) 5 to 95% by weight of at least one component selected from an acetylene glycol having the general formula (1):

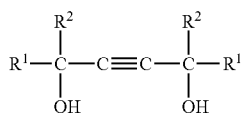

wherein $R^1$ and $R^2$ each are a $C_1$-$C_5$ alkyl group, and an ethylene oxide and/or propylene oxide adduct of acetylene glycol having the general formula (2):

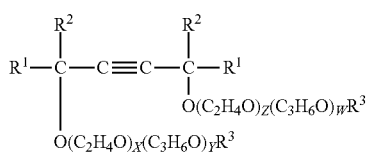

wherein $R^1$, $R^2$ and $R^3$ each are a $C_1$-$C_5$ alkyl group, X and Z each are a positive number of 0.5 to 25, Y and W each are 0 (zero) or a positive number of more than 0 to 25, and the sum of X+Y+Z+W is 1 to 50, and (B) 5 to 95% by weight of a polyoxyalkylene-modified silicone selected from the group consisting of the polyoxyalkylene-modified silicones of the following formulae (6) to (13):

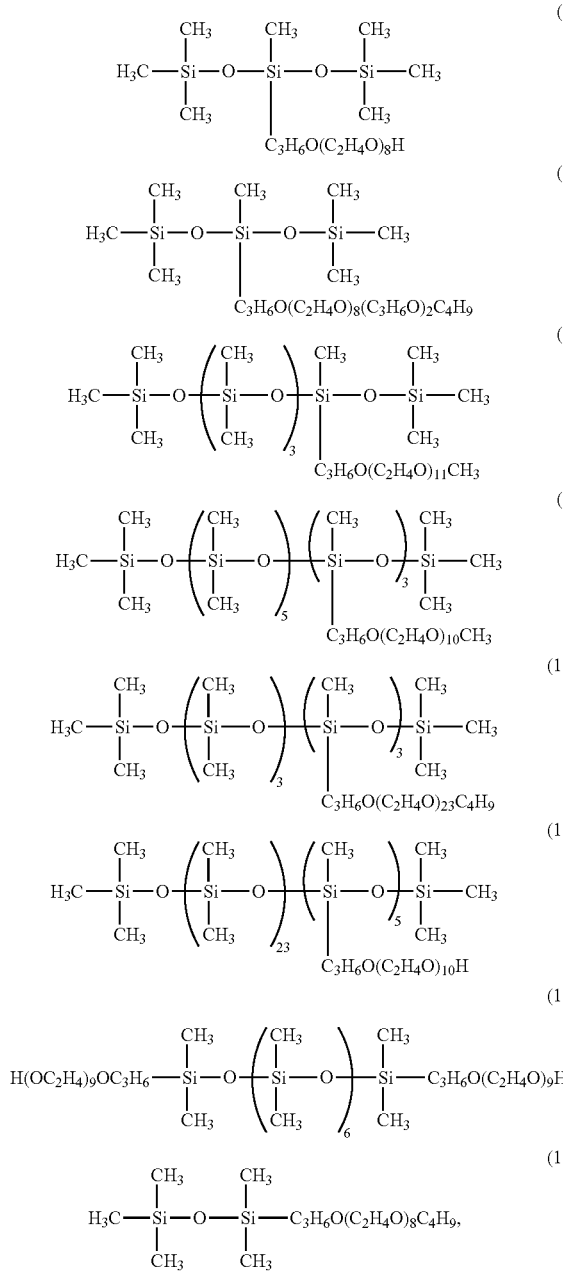

the content of said glass fiber-treating agent being 0.01 to 5% by weight to the total weight of the silane coupling agent solution.

2. The glass fiber-treating composition of claim 1, wherein the glass fiber-treating composition further comprises deionized water, or a water soluble organic solvent selected from the group consisting of ethylene glycol, diethylene glycol, triethylene glycol, tetraethylene glycol, polyethylene glycol, propylene glycol, dipropylene glycol, 1,3-propane diol, 1,4-butane diol, and glycerin, in an amount of 5 to 20% by weight based on the weight of the overall composition.

3. The glass fiber-treating composition of claim 1, wherein component (A) is selected from the group consisting of 2,4,7,9-tetramethyl-5-decyne-4,7-diol, 3,6-dimethyl-4-octyne-3,6-diol, 2,5,8,11-tetramethyl-6-dodecyne-5,8-diol, an ethylene oxide adduct of 2,4,7,9-tetramethyl-5-decyne-4,7-diol, an ethylene oxide and propylene oxide adduct of 2,4,7,9-tetramethyl-5-decyne-4,7-diol, and an ethylene oxide and propylene oxide adduct of 2,4,7,9-tetramethyl-5-decyne-4,7-diol.

4. The glass fiber-treating composition of claim 1, wherein component (B) is selected from the group consisting of the polyoxyalkylene-modified silicones of the following formulae (6) to (9):

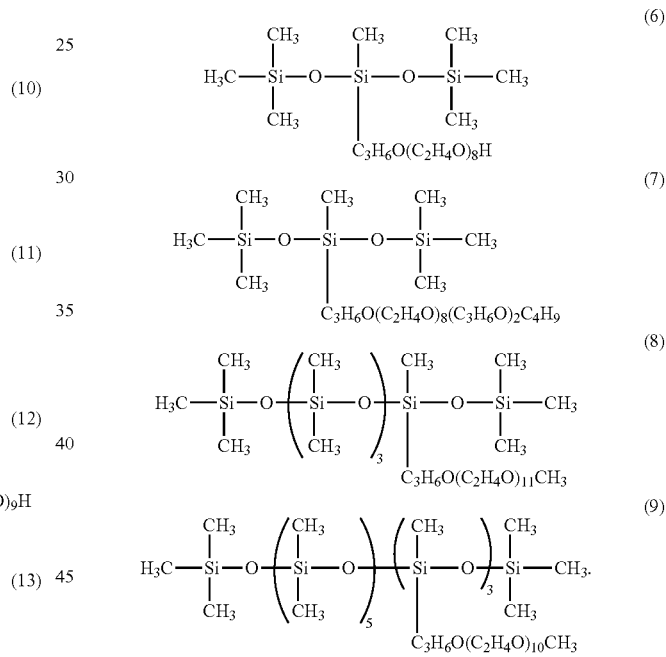

5. The glass fiber-treating composition of claim 1, wherein the silane coupling agent comprises γ-methacryloxypropyltrimethoxysilane.

* * * * *